(12) United States Patent
Chen

(10) Patent No.: US 7,545,631 B2
(45) Date of Patent: Jun. 9, 2009

(54) PORTABLE COMPUTER

(75) Inventor: Hsiang Chen, Taipei (TW)

(73) Assignee: Inventec Corporation (TW)

( * ) Notice: Subject to any disclaimer, the term of this patent is extended or adjusted under 35 U.S.C. 154(b) by 239 days.

(21) Appl. No.: 11/808,440

(22) Filed: Jun. 11, 2007

(65) Prior Publication Data

US 2008/0304222 A1    Dec. 11, 2008

(51) Int. Cl.
*G06F 1/16* (2006.01)
(52) U.S. Cl. .............................. 361/679.55
(58) Field of Classification Search .......... 361/683, 361/679.55, 679.26, 679.27, 679.02, 679.09; 439/13
See application file for complete search history.

(56) References Cited

U.S. PATENT DOCUMENTS

| | | | |
|---|---|---|---|
| 5,193,069 A * | 3/1993 | Furuya ................. | 361/679.09 |
| 6,359,773 B1 * | 3/2002 | Chang et al. ........... | 361/679.09 |
| 6,700,773 B1 * | 3/2004 | Adriaansen et al. .... | 361/679.08 |
| 2003/0021082 A1 * | 1/2003 | Lu et al. ..................... | 361/683 |
| 2005/0139740 A1 * | 6/2005 | Chen et al. ............... | 248/286.1 |
| 2006/0028791 A1 * | 2/2006 | Huang et al. ................ | 361/683 |
| 2006/0176656 A1 * | 8/2006 | Sullivan ..................... | 361/683 |
| 2008/0144262 A1 * | 6/2008 | Lai ........................... | 361/680 |
| 2008/0180892 A1 * | 7/2008 | Lai ........................... | 361/680 |

* cited by examiner

*Primary Examiner*—Lisa Lea-Edmonds
(74) *Attorney, Agent, or Firm*—Bacon & Thomas, PLLC

(57) ABSTRACT

The present invention discloses a portable computer that includes a main body substantially in the form of a panel and a supporting base separately disposed on both sides of the main body and pivotally coupled to a position proximate to the bottom of the main body, such that the main body can be turned into a position between the two supporting bases and integrally coupled to the two supporting bases, or the main body can be turned out from a position between the two supporting bases, and the main body can be placed on a disposing surface by the support of the two supporting bases.

5 Claims, 3 Drawing Sheets

PORTABLE COMPUTER

FIELD OF THE INVENTION

The present invention relates to a portable computer, and more particularly to a portable computer having a main body and two supporting bases, such that the main body can be turned into or out from a position between the two supporting bases for exposing or hiding a signal connector respectively.

BACKGROUND OF THE INVENTION

Since the chance for us to use mobile electronic products including portable computers, mobile phones, MP3 players, game players (such as PSP), digital cameras, and automobile navigation systems in our daily life becomes increasingly larger, these products can definitely reduce the time and distance between people. Major electronic manufacturers keep introducing innovative products into the market and tend to develop their products with a multiple of functions, so as to meet the user requirements. Particularly, research and development focused on integrating the document editing, multimedia playing and wireless networking functions into the mobile electronic products, and thus users need not to purchase other related devices to have all these functions, and the situation of whether or not the mobile electronic products can provide a more convenient and effective structure becomes an important index to determine whether or not the high-tech products produced by a country lead others.

At present, mobile electronic products tend to be developed with the light, thin, short and compact features during the rapid development of the electronic industry, and both size and weight of mobile electronic products become increasingly smaller, and an ultra-mobile PC (UMPC) with the size and weight falling between those of a personal digital assistant (PDA) and a notebook (NB) computer is introduced, and the UMPC does not require any external peripheral (including keyboard, mouse, and handwriting pad, etc), but adopts a touch panel as an input device for providing the functions of displaying a screen, moving a cursor, and writing a text to reduce the weight of the UMPC.

However, the UMPC builds in many functions while minimizing its size and weight, and such requirement becomes a big challenge to UMPC designers and manufacturers, and thus it is beneficial to consumers if an UMPC can concurrently provide all functions required by users as well as a convenient-to-carry feature.

SUMMARY OF THE INVENTION

In view of the foregoing shortcomings of the prior art, the inventor of the present invention based on years of experience in the related industry to conduct extensive researches and experiments, and finally developed a portable computer in accordance with the present invention to overcome the shortcomings of the prior art.

It is a primary objective of the present invention to provide a portable computer, comprising a board-like main body and two supporting bases. Both lateral sides of the main body are pivotally coupled to the two supporting bases, so that the main body can be turned into a position between the two supporting bases to combine the main body with the two supporting bases, or the main body can be turned out from a position between the two supporting bases, such that the main body can be placed on a disposing surface by the support of the two supporting bases. Therefore, users can use the main body while the main body is erected.

Another objective of the present invention is to provide a portable computer, wherein if the main body is turned out from a position between the two supporting bases, an external device can be installed movably between the two supporting bases, and the two supporting bases separately include a first track disposed at a position opposite to a lateral side of the main body, and both lateral sides of the external device separately have a second track, and two second tracks are engaged with two first tracks respectively and movably extended into or out from a position between two supporting bases.

A further objective of the present invention is to provide a portable computer, wherein a slot is built at a lateral side of the portable computer where the main body and the two supporting bases are connected, and a spindle is pivotally coupled to the main body in the slot, and the spindle comes with a signal connector connected with the main body, and the signal connector can be driven by the spindle to expose the signal connector from the slot and connect an external device for exchanging electronic signals or to hide the signal connector into the main body.

Another further objective of the present invention is to provide a portable computer, wherein an image capturing device is installed at an end of any one of the supporting bases that is pivotally coupled to the main body, and the image capturing device is coupled to the main body through the supporting base for capturing an external image and transmitting the image to the main body.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
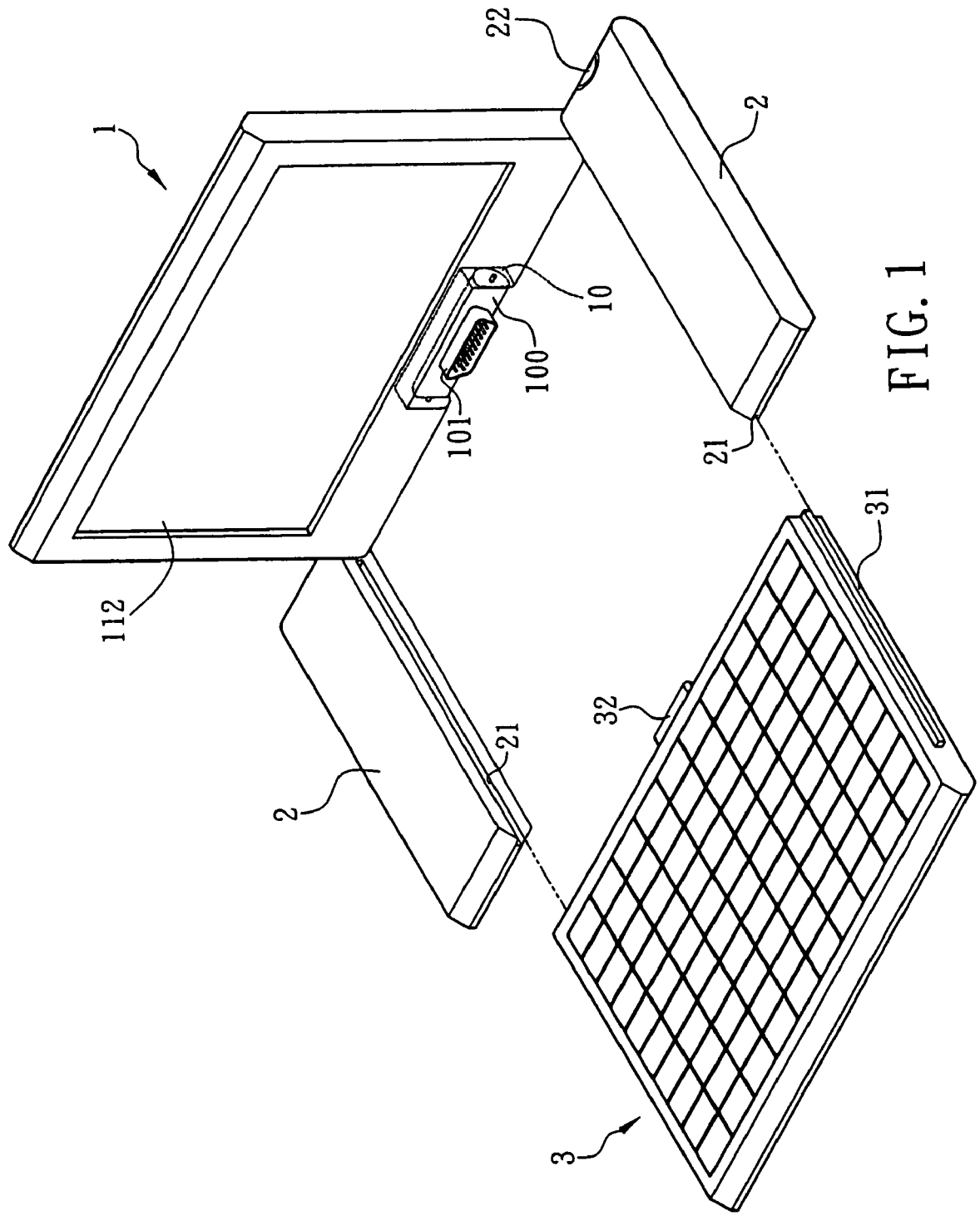
FIG. 1 is a perspective view of an embodiment of the present invention.

Referring to FIG. 1 for a portable computer of the present invention, the portable computer comprises a main body 1 and two supporting bases 2, and the main body 1 is substantially a panel with both lateral sides proximate to a bottom side of the main body 1 pivotally coupled to the two supporting bases 2, such that the main body 1 can be turned into a position between the two supporting bases 2 to combine the main body 1 with the two supporting bases 2, or the two supporting bases 2 can be turned away from the main body 1 and disposed parallelly on a disposing surface (not shown in the figure), and the main body 1 is erected on the disposing surface by the support of the two supporting bases 2, such that a user can use the erected main body 1. If the main body 1 is turned out from the position between the two supporting bases 2, an external device 3 (such as a keyboard or a DVD player) can be movably installed between the two supporting bases 2, and a first track 21 (such as a concave track or a convex track) is disposed on a lateral side of the two supporting bases 2 and opposite to the main body 1, such that a second track 31 (such as a convex track or a concave track) disposed separately on both lateral sides of the external device 3 can be engaged with the two first tracks 21 respectively, and the two second tracks 31 can be engaged with the two first tracks 21, and movably extended into or out from a position between the two supporting bases 2.

The main body 1 is connected to a slot 10 at a lateral side of the two supporting bases 2, and the main body 1 has a spindle 100 pivotally coupled in the slot 10, and the spindle 100 has a signal connector 101, and the signal connector 101 is coupled to the main body 1 through the spindle 100, and the signal connector 101 can be driven by the spindle 100 to the exterior precisely opposite to the main body 1, such that the signal connector 101 is exposed from the slot 10 and connected to an external device 3 for exchanging electronic signals; or the spindle 100 can be driven and hidden into the main body 1, when the signal connector 101 is not in use.

Figure 3:
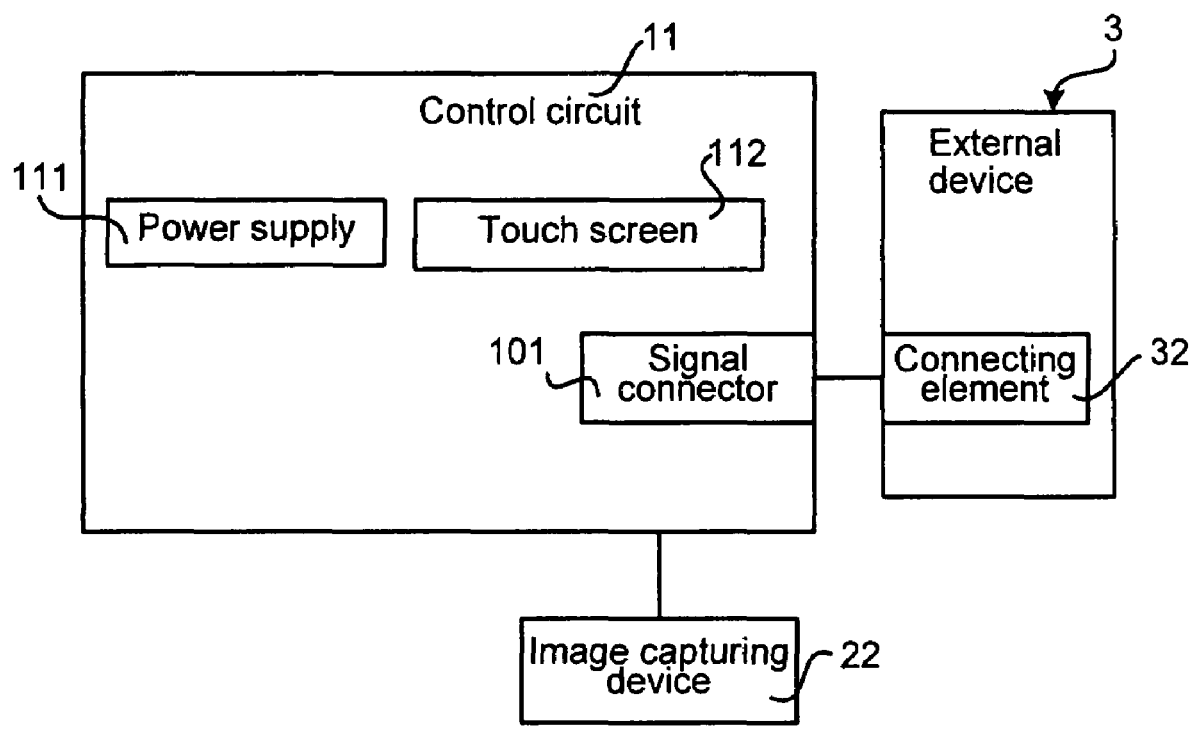
FIG. 3 is a block diagram of the present invention.

Referring to FIGS. 1 and 3 for the present invention, the main body 1 comprises a control circuit 11, a power supply 111 and a touch screen 112, and the control circuit 11 (which includes a motherboard, a central processing unit and other computing unit) is installed in the main body 1, and the signal connector 101 is coupled to the external device 3 and in charge of the basic operation of the main body 1, and the power supply 111 (including a rechargeable battery and a transformer unit of the public utility power) is installed in the main body 1 and coupled to the control circuit 11 for supplying the required operating power to the main body 1, and the touch screen 112 is installed at a front side of the main body 1 and coupled to the control circuit 11, for inputting signals and displaying data.

In FIGS. 1 and 3, an image capturing device 22 is disposed at an end of the main body 1 that is pivotally coupled to an end of any one of the supporting bases 2, and the image capturing device 22 is coupled to the control circuit 11 through the supporting base 2, for capturing an external image and transmitting the image to the main body 1.

Figure 2:
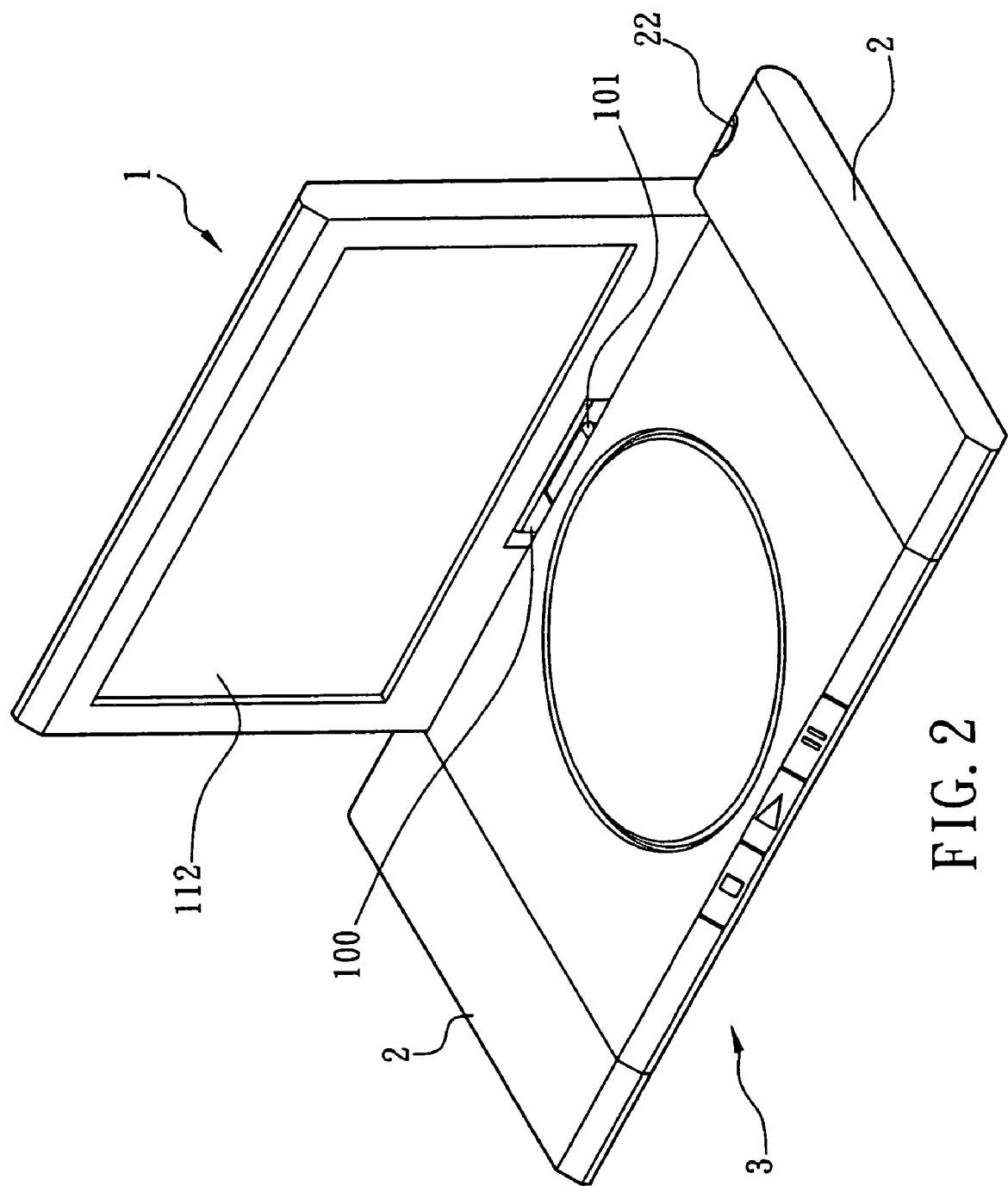
FIG. 2 is a perspective view of another embodiment of the present invention.

In FIG. 1, a connecting element 32 is disposed at the external device 3 and opposite to a lateral side of the signal connector 101, such that the connecting element 32 can transmit a signal generated by a circuit (not shown in the figure) of the external device 3 to the main body 1 through the signal connector 101, or receive a signal fed back from the main body 1 through the signal connector 101. Referring to FIG. 1 for a preferred embodiment of the present invention, an external device 3 could be a keyboard, such that if the two supporting bases 2 are turned from the position between both lateral sides of the main body 1, the two supporting bases 2 are disposed parallelly on the disposing surface, and the spindle 100 is driven to expose the signal connector 101 for extending the keyboard to a position between the two supporting bases 2, and connecting the connecting element 32 to the signal connector 101, so that a user can input data from the touch screen 112 when the main body 1 is erected. Referring to FIGS. 2 and 3 for another preferred embodiment of the present invention, the external device 3 can be a DVD player, such that when the two supporting bases 2 are turned out from a position between both ends of the main body 1, the two supporting bases 2 are disposed parallelly on the disposing surface, and the spindle 100 is driven to expose the signal connector 101 to face the connecting element 32 of the DVD player, such that the DVD player can be extended to a position between two supporting bases 2, and the connecting element 32 is coupled to the signal connector 101, and a user can view the outputted image from the touch screen 112, when the main body 1 is erected.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A portable computer, comprising:
two supporting bases each having a first track disposed at a lateral side thereof;
a main body, being substantially a panel, with both lateral sides proximate to a bottom side of the main body pivotally coupled to said supporting bases at the lateral sides of the supporting bases having the first tracks respectively, so that when said main body is turned into a position between said two supporting bases, said two supporting bases are combined together, or when said main body is turned out from a position between said two supporting bases, said two supporting bases are disposed parallelly for supporting a disposing surface.

2. The portable computer of claim 1, wherein said main body comprises:
a slot, disposed at said main body on a position between lateral sides of said two supporting bases pivotally coupled with said main body;
a spindle, disposed in said slot and pivotally coupled to said main body;
a signal connector, installed on a lateral side of said spindle, and driven by said spindle to be exposed to the outside or driven by said spindle to be hidden in said main body.

3. The portable computer of claim 2, wherein said main body comprises:
a control circuit, installed in said main body, and coupled to said signal connector;
a touch screen, installed at a front side of said main body, and coupled to said control circuit, for inputting a signal and outputting a data;
a power supply, installed in said main body, and coupled to said control circuit, for supplying required working electric power to said main body.

4. The portable computer of claim 3, further comprising an image capturing device disposed on any one of said supporting bases at one end pivotally coupled to said main body, and said image capturing device is coupled to said control circuit through said supporting base.

5. The portable computer of claim 2, wherein if said main body is turned out from a position between said two supporting bases, an external device is movably disposed at a position between said two supporting bases, and comprises:
a connecting element, installed at one side of said external device and having one end coupled to a circuit in said external device, and another end coupled to said signal connector; and
second tracks, disposed on both lateral sides of said external device proximate to said connecting element for engaging with said first tracks disposed at said two supporting bases respectively.

* * * * *